United States Patent Office 3,426,097
Patented Feb. 4, 1969

3,426,097
LATENT CURING AGENTS FOR EPOXIDE
POLYMERS AND POLYURETHANES
Gust A. Ilkka, Rochester, Mich., and Robert V. Slates, Syracuse, N.Y., assignors to General Motors Corporation, Detroit, Mich., a corporation of Delaware
No Drawing. Filed Aug. 24, 1965, Ser. No. 482,259
U.S. Cl. 260—830    11 Claims
Int. Cl. C08g 51/84, 22/04, 23/00

ABSTRACT OF THE DISCLOSURE

A particulate diamine curing agent which is operable to rapidly cure polyurethane prepolymer compositions, polyepoxide compositions, and mixtures of these materials at elevated temperatures, but which agent is nonreactive with these compositions at room temperature, is prepared by reacting the solid amine in finely divided particulate form with an aqueous solution of formaldehyde for a time sufficient to convert amine groups exposed at the surface of the particle to chemical entities which are nonreactive with the synthetic resins at room temperature thereby blocking off the reactive amine groups below the surface, and separating the solid curing agent from the aqueous formaldehyde solution.

This invention relates to rapid curing polyurethane and polyepoxide based adhesives and more particularly it relates to a latent or dormant curing agent for such adhesives.

In order for an adhesive to be useful in production applications it must have certain characteristics in addition to those which relate to its strength and its ability to resist humidity, salt, solvents and other corrosive media. To be used in production it must be rapid curing, nontoxic, easy to handle and it must have a relatively long shelf life so that an adequate supply can be kept on hand. In the past few years a number of new polymeric substances have been introduced which have found application as adhesives. These include epoxide resins and polyurethanes. These substances are not self curing but usually require the incorporation of another chemical into the formulated state for the purpose of cross linking and chain extending. This process is known as curing. Heretofore if an effective curing agent, one which would rapidly cure the adhesive mixture at elevated temperatures, was blended in with the adhesive composition prior to use the material would start to gel and eventually become unusable because it could not be worked and applied to the surfaces to be joined.

However, an ideal adhesive composition would be a one part formulation having a long shelf life, perhaps as long as 4–6 months, but which after application could be heated to effect an extremely rapid cure. An additional benefit of an adhesive having an extended shelf life at room temperature is that equipment in which it is used need not be cleaned immediately thereafter. A solution to this problem which is the subject of this invention lies in the preparation of a dormant or latent curing system which at room temperature and under normal atmospheric conditions is unreactive with the adhesive composition, but which becomes reactive at elevated temperatures and effects a cure in the short time required by production line demands.

It is an object of this invention to provide a dormant curing agent for amine curable synthetic resins and an adhesive composition comprised of said dormant curing agent and said synthetic resin.

It is another object of this invention to provide a dormant curing agent for polyurethane and epoxide based resins, whereby said curing agent is substantially unreactive in said resin system at normal room temperatures and atmospheric conditions but which will rapidly effect a cure of the composition upon its being heated, and to provide an adhesive composition comprised of said dormant curing agent and said resins.

It is another object of this invention to provide a method of surface treating an amine curing agent so as to render it substantially unreactive in polyurethane and/or epoxide resin systems at normal room temperatures and atmospheric conditions, but which will effect a rapid cure of the composition upon being heated.

It is a more specific object of this invention to provide a particulate difunctional primary amine for use as a curing agent when incorporated in adhesive compositions, said curing agent having been processed so as to be unreactive at normal room conditions but so as to be capable of effecting a rapid cure of the adhesive composition upon being heated.

These and other objects are accomplished by reacting a difunctional primary amine in finely divided particulate form with formaldehyde, for example an aqueous solution thereof, such that the amine groups in the surface of said particle are inactivated by conversion to chemical entities which are ineffectual in curing synthetic resins and which effectively block off the latent amine groups within the bulk of said particle rendering them unreactive at normal room condtions, and incorporating said curing agent with polyurethane prepolymers and/or an epoxide compound to form an adhesive or surface coating composition which has an extended shelf life at normal room conditions and which is rapidly cured upon heating.

It is well known in the prior art that amines may be used to cure many polymeric substances. The active hydrogen furnished by a primary or secondary amine will react with the isocyanate groups which characterize urethane prepolymers. The primary and secondary amines will also react with the epoxy groups. A multifunctional amine then can act as a chain lengthener or as a cross linking bridge between two chains. It is this type of reaction that is involved in the curing process.

In this invention it is desirable to prevent the curing reactions at room temperature. To accomplish this a primary diamine curing agent in solid finely particulate form is reacted on its surface with formaldehyde. Usually an aqueous solution of formaldehyde is used. The reaction between amine groups in the surface of the particle and the formaldehyde convert the amine to a chemical species which is ineffectual for curing synthetic resins. It is not known in detail exactly what reaction products are formed. It is possible that initially a secondary amine-methylol compound is formed according to the following reaction:

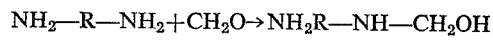

NH₂—R—NH₂+CH₂O→NH₂R—NH—CH₂OH

If this compound is in fact formed it may further react with a second molecule of the amine to form a bis amino methane. Further reaction may take place between formaldehyde and the remaining hydrogen groups on the secondary amines. Alternatively, it is possible that an oxime is formed. At any rate, a reaction of the surface amine groups for a brief time with formaldehyde effectively renders these groups inactive. Whatever compounds are formed, whether they be monomeric or polymeric, on the surface of the amine particle, they effectively block or shield the active amino groups underneath and render the curing agent dormant or latent with respect to amine curable synthetic resins at room temperatures.

Both aliphatic and aromatic primary diamines are useful in curing adhesive compositions. However, in the application of this invention a solid amine is required. For this reason many of the commercially available aliphatic diamines are excluded because they are liquids. However, any solid diamine would be useful.

Examples of solid primary diamines which may be rendered dormant by the process of this invention include 2,4,5,6 - tetrachloro-m-xylene-α,α'-diamine, orthotolidine, 1,5-naphthylene diamine, methylene bis-chloroaniline, ortho-, meta-, and para-phenylene diamine, oxydianiline, and anisidine.

Since these solid amines are not particularly soluble in the polyurethane prepolymers and epoxide resins in which they are incorporated, it is desirable that they be in finely divided particulate form if they are to be readily mixed into the adhesive formulation and are to effect an extremely rapid cure. While larger amine particles are operable in this invention, their size should preferably be in the range of 10–1000 microns and more ideally in the range of 10–50 microns. For example, when a sample of o-tolidine, unreacted with formaldehyde, with a particle size of 40 microns is added to a given adhesive composition the sample of adhesive is found to set to an unusable state in 3–4 minutes at room temperature. When the particle size of the amine is increased to 60–100 microns no setting of the same adhesive is observed after 12 hours and only slight gelation has taken place after a period of 24 hours. At the elevated temperatures where rapid curing occurs this difference is less pronounced. However, a catalyst with a fine particle size is more readily mixed into the adhesive mixture to obtain a uniform composition and the resulting mixture cures more rapidly and evenly.

The above solid amine compounds are virtually insoluble in water at room temperature. Since it is necessary that they be reacted with formaldehyde only at their surfaces it is preferable that the reaction be conducted in an aqueous medium. Thus, an aqueous solution of formaldehyde, conveniently the commercial 37% solution, may be used. More dilute solutions may be substituted if a longer reaction period is desired. The solid amine is slurried and stirred rapidly at room temperature for a period of a few minutes, usually less than 5, in the formaldehyde solution. It is then quickly removed by filtration, washed with water, and dried. Normally drying may be accomplished in five or six hours under vacuum at 180° F. The treated amine may then be incorporated into a suitable adhesive composition. It this composition it will have a shelf life of several weeks or months and yet when the composition is heated to an elevated temperature for curing the amine will affect a rapid cure to a high strength adhesive.

Obviously other suitable solvents could be used. The requirement is that the solvent dissolve formaldehyde and not the amine. Furthermore, it must be substantially inert with respect to both. The reaction may also be conducted using formaldehyde as a vapor. However, it is much more difficult to control this reaction.

Normally, when an aqueous solution of formaldehyde is used the reaction is conducted at room temperature. This is sufficient since the reaction proceeds rapidly. However it is to be understood that with varying solvents and formaldehyde concentrations other temperature ranges may be preferred.

The treated amine particle is substantially insoluble in the resin compositions that it cures, at least at room temperature. Thus, the inert shield remains intact and the curing agent is dormant. However, upon heating to elevated temperatures, those in excess of 150° F., the curing reactions proceed very rapidly. Apparently such temperatures effect a breakdown or elimination of the blocking groups. This may be due to decomposition, or melting and dissolution. This is one of the most important advantages of the one-part latent curing agent-structural adhesive formulations of this invention. They have a long shelf life at normal room conditions, but are rapidly cured at elevated temperatures.

The curing agents of this invention can be used in combination with any amine curable resin system. However, in the specific applications of the automotive industry it has been particularly well applied to polyurethane and epoxy resins. Polyurethane prepolymers are rapidly cured by amines but the adhesive bond to metals is relatively weak. Epoxy resins cure to a much stronger adhesive but the rate of curing is too slow for many production applications. However, in a mixture of the two the larger proportion of which is a polyurethane prepolymer, the advantages of each type of compound may be combined. For this reason much of the work with the latent catalyst of this invention has been with adhesive formulations including both polyurethane and epoxy compounds.

The curing agents are useful in a wide range of urethane prepolymers. Urethane prepolymers are formed by the reaction of a multifunctional isocyanate with a polyol in which the polyol is a reactive hydrogen containing compound having at least two hydroxyl groups, such as a hydroxyl terminated polyether or polyester having a molecular weight of at least 500. The preparation of suitable polyester urethane and polyether urethane prepolymers are described in U.S. Patents 2,620,516, 2,625,531, 2,692,-873 and 2,692,874. Suitable polyurethanes are prepared by reacting an organic diisocyanate with a dihydroxy polyester such as polyethylene adipate or with a dihydroxy polyether such as polybutylene ether glycol.

Suitable diisocyanates are any aromatic and/or aliphatic diisocyanates such as p,p'-diisocyanato diphenyl methane, 2,4-toluene diisocyanate, naphthylene-1,5-diisocyanate and hexamethylene diisocyanate.

The amine curing agent of this invention is also useful to cure epoxy resins. Although there are a number of possible reactants and a wide variety of possible epoxy resin molecules, the ones having known commercial significance in the United States are: the diglycidyl ether of bisphenol A (and its homologs), glycidyl ethers of glycerol, butanediol and other aliphatic polyhydric alcohols, diglycidyl ethers of resorcinol and other aromatic polyhydric alcohols, glycidyl ether of bisphenol F, glycidyl ether of tetrakis (hydroxy phenyl) ethane, and polyglycidyl ethers of polynuclear polyhydroxy phenols such as the novolac resins.

As mentioned above, in many applications it is desirable to formulate mixtures of epoxy and urethane resins. Where ease of application is an important criterion it may be desirable to have the respective polymeric components in liquid form. Thus, an adhesive composition in which the curing agent of this invention has found particularly advantageous application is in the mixture of a liquid polyurethane prepolymer, formed by the reaction between toluene diisocyanate and polybutylene ether glycol and having a free isocyanate content in the range of 4 to 10% by weight of said prepolymer and a low molecular weight liquid diepoxide or polyepoxide such as resorcinol diglycidyl ether or butanediol glycidyl ether.

The following specific examples more clearly illustrate the practice and utilization of our invention:

Example I

A novel latent amine curing agent was prepared in the following manner: 100 grams of orthotolidine having a particle size of 40 microns was stirred rapidly for one minute at room temperature in 1,000 milliliters of a 37% aqueous formaldehyde solution. The orthotolidine was then quickly removed by filtration and washed with a total of 1,000 milliliters of water. It was subsequently dried for five hours at 180° F. under vacuum. 28 grams of this material was then added to 100 grams of a liquid polyurethane prepolymer formed by the reaction between toluene diisocyanate and polybutylene ether glycol having about 9.5% free isocyanate groups and 10 grams of resorcinol diglycidyl ether. This mixture was thoroughly blended. It was found that this mixture had a room temperature pot life of over one month. The curing and adhesive properties of this composition were tested in the following manner:

Lap shear strips of pre-cut SAE 1020 cold rolled steel were prepared with the above adhesive composition and tested according to the ASTM procedure D-1002. They were cured for five minutes at 250° with a cure pressure of one pound per square inch. The lap shear strength at room temperature after twenty-four hours aging was 2070 pounds per square inch. This was the average of two tests. The room temperature shear strength after 9 days of aging was 2610 pounds per square inch.

Example II

A similar adhesive composition was prepared using 28 parts of untreated orthotolidine. A 10 gram batch of this material had a room temperature pot life of 2¾ to 3 minutes including mixing time. Yet upon rapid curing at 250° F. the lap shear strengths were no greater than those obtained in Example I.

As further evidence that the formaldehyde treatment is a surface phenomenon some of the treated orthotolidine as prepared in Example I which gave a pot life of over one month in that adhesive composition was ball milled with stainless steel balls to break up the particles and expose their interior. When 28 grams of this material was incorporated into 100 grams of polyurethane prepolymer and 10 grams of resorcinol diglycidyl ether, a room temperature pot life of two minutes and 30 seconds resulted.

The fact that the compounds produced by the surface reaction of formaldehyde do not enter into the curing reaction is further shown by the fact that orthotolidine may be dissolved in benzene and completely reacted with formaldehyde in the absence of water. When this compound was tested by incorporating it into the adhesive compositions disclosed above, no significant curing resulted even at temperatures as high as 400° F.

1,5-naphthylene diamine, methane bis-chloraniline, 2,4,5,6-tetrachloro-m-xylene-α,α'-diamine were also treated in a manner similar to the processing of orthotolidine in Example I. Each was stirred in a 37% by weight solution of formaldehyde in water, filtered, washed with water, and dried in vacuum. For each solid diamine it was necessary to determine a suitable reaction time in the formaldehyde solution. This was accomplished by actual test. For example, separate small amounts of a given diamine were reacted with formaldehyde in aqueous solution for periods of one minute, two minutes, three minutes and five minutes at room temperature to determine the time required to render the diamine latent in the adhesive formulation of Example I at room temperature. Once a preferred reaction time has thus been established substantial quantities of the curing agent may be processed and imbodied in an amine cured adhesive formulation.

While this invention has been described in terms of certain specific examples and embodiments, it is to be understood that other applications would be apparent to those skilled in the art and are within the scope of the invention as defined by the following claims.

We claim:

1. A finely divided particulate latent diamine curing agent suitable for curing polyurethane prepolymer compositions, epoxide polymer compositions wherein said epoxide has more than one 1,2-epoxide group, and mixtures of said compositions where said curing agent is prepared by reacting a solid particulate diamine with a sufficient quantity of formaldehyde in aqueous solution for a time sufficient to convert the diamine molecules in or near the surface of said particle which are exposed to said aqueous formaldehyde solution to chemical compounds which are nonreactive with said polymers at room temperature, the active amine groups below the surface of said solid particle thereby being blocked off by said compounds and prevented from reacting to cure said compositions in mixtures therewith at room temperature, the solubility of said diamine in said aqueous formaldehyde and the quantity of said aqueous formaldehyde being such that the major portion of said particle remains as a separate solid phase throughout said reaction; and removing said reacted solid diamine particles from said aqueous solution of formaldehyde.

2. A finely divided particulate latent diamine curing agent as in claim 1 wherein the particle size of said diamine is from 10 to 1000 microns in diameter.

3. A finely divided particulate latent diamine curing agent as in claim 1 wherein said amine is taken from the group consisting of 2,4,5,6-tetrachloro-m-xylene-α,α' - diamine, orthotolidine, 1,5-naphthylene diamine, methylene bis-chloroaniline, o-phenylene diamine, m-phenylene diamine, p-phenylene diamine, oxydianiline and anisidine.

4. A finely divided particulate latent diamine curing agent in a polyurethane prepolymer composition, an epoxide polymer composition wherein said epoxide has more than one 1,2-epoxide group, or in mixtures of a said polyurethane composition and a said epoxide composition where said curing agent is prepared by reacting a solid particulate diamine with a sufficient quantity of formaldehyde in aqueous solution for a time sufficient to convert the diamine molecules in or near the surface of said particle which are exposed to said aqueous formaldehyde solution to chemical compounds which are nonreactive with said polymers at room temperature, the active amine groups below the surface of said solid particle thereby being blocked off by said compounds and prevented from reacting to cure said compositions in mixtures therewith at room temperature, the solubility of said diamine in said aqueous formaldehyde and the quantity of said aqeuous formaldehyde being such that the major portion of said particle remains as a separate solid phase throughout said reaction; and removing said reacted solid diamine particles from said aqueous solution of formaldehyde.

5. A finely divided particulate latent diamine curing agent as in the composition combination of claim 4 wherein the particle size of said diamine is from 10 to 1000 microns in diameter.

6. A finely divided particulate latent diamine curing agent as in the composition combination of claim 4 wherein said amine is taken from the group consisting of 2,4,5,6-tetrachloro-m-xylene-α,α'-diamine, orthotolidine, 1,5-naphthylene diamine, methylene bis-chloroaniline, o-phenylene diamine, m-phenylene diamine, p-phenylene diamine, oxydianiline and anisidine.

7. A method of preparing a latent diamine curing agent suitable for curing polyurethane prepolymers and epoxide compositions wherein said epoxide has more than one 1,2-epoxide group comprised of reacting a solid particulate diamine with a sufficient qauntity of formaldehyde in aqueous solution for a time sufficient to convert the diamine molecules in or near the surface of said particle which are exposed to said aqueous formaldehyde solution to chemical compounds which are nonreactive with said polymers at room temperatures, the active amine groups below the surface of said solid particle thereby being blocked off by said compounds and prevented from reacting to cure said compositions in mixtures therewith at room temperature, the solubility of said diamine in said aqueous formaldehyde and the quantity of said aqueous formaldehyde being such that the major portion of said particle remains as a separate solid phase throughout said reaction; removing said reacted solid diamine particles from said aqueous solution of formaldehyde; and incorporating said latent curing agent into a formulation containing a polyurethane prepolymer composition, a said epoxide polymer composition or mixtures thereof.

8. The method as in claim 7 wherein said diamine is taken from the group consisting of 2,4,5,6-tetrachloro-m-xylene-α,α'-diamine, orthotolidine, 1,5-naphthylene diamine, methylene bis-chloroaniline, o-phenylene diamine, m-phenylene diamine, p-phenylene diamine, oxydianiline and anisidine.

9. A method as in claim 7 wherein said reaction is conducted at room temperature.

10. A method as in claim 7 wherein said latent curing agent has a maximum dimension in the range of 10 to 1000 microns.

11. A one-part adhesive formulation comprised of a liquid polyurethane prepolymer, formed by the reaction between a toluene diisocyanate and a polyalkylene ether glycol, said prepolymer characterized by an isocyanate content from about 4.0% to 10.0%; a low molecular weight liquid glycidal ether epoxide compound having more than one 1,2-epoxide group; and a latent solid particulate primary diamine curing agent when prepared by the method of claim 7.

References Cited

UNITED STATES PATENTS

| | | | |
|---|---|---|---|
| 2,994,669 | 8/1961 | Hader | 260—72.5 |
| 3,026,285 | 3/1962 | Hirosawa | 260—834 |
| 3,310,602 | 3/1967 | Lemon | 260—834 |

SAMUEL H. BLECH, *Primary Examiner.*

P. LIEBERMAN, *Assistant Examiner.*

U.S. Cl. X.R.

260—47, 858, 834, 849, 72, 72.5, 77.5; 117—100